(12) United States Patent
Suau et al.

(10) Patent No.: US 10,214,599 B2
(45) Date of Patent: Feb. 26, 2019

(54) METHOD FOR THE CONTINUOUS PRODUCTION OF ANIONIC POLYMERS USING RADICALS

(71) Applicant: COATEX, Genay (FR)

(72) Inventors: Jean-Marc Suau, Lucenay (FR); Yves Matter, Quincieux (FR); Dominique Peycelon, Bouligneux (FR); Jean-Luc Dubois, Millery (FR)

(73) Assignee: COATEX, Genay (FR)

(*) Notice: Subject to any disclaimer, the term of this patent is extended or adjusted under 35 U.S.C. 154(b) by 0 days.

(21) Appl. No.: 15/521,725

(22) PCT Filed: Dec. 17, 2015

(86) PCT No.: PCT/FR2015/053561
§ 371 (c)(1),
(2) Date: Apr. 25, 2017

(87) PCT Pub. No.: WO2016/097614
PCT Pub. Date: Jun. 23, 2016

(65) Prior Publication Data
US 2017/0240668 A1    Aug. 24, 2017

(30) Foreign Application Priority Data
Dec. 19, 2014 (FR) .................................. 14 62899

(51) Int. Cl.
*C08F 120/06* (2006.01)
*C08F 20/06* (2006.01)
*C08F 2/01* (2006.01)

(52) U.S. Cl.
CPC ............. *C08F 120/06* (2013.01); *C08F 2/01* (2013.01); *C08F 20/06* (2013.01)

(58) Field of Classification Search
USPC .......................................................... 526/64
See application file for complete search history.

(56) References Cited

U.S. PATENT DOCUMENTS

| 4,252,924 A * | 2/1981 | Chatterjee | ................. C08F 8/44 525/327.8 |
| 6,429,268 B1 * | 8/2002 | Xiongwei | ............ B01J 19/0013 422/130 |
| 2011/0054071 A1 * | 3/2011 | Mattmann | ................. C08F 2/00 523/351 |
| 2011/0288060 A1 * | 11/2011 | Ruecroft | ................. B01D 9/005 514/174 |
| 2014/0088280 A1 | 3/2014 | Mattmann et al. | |

FOREIGN PATENT DOCUMENTS

WO        99/55457 A1    11/1999

OTHER PUBLICATIONS

Micic, Nenad et al., "Scale-up of the Reversible Addition-Fragmentation Chain Transfer (RAFT) Polymerization Using Continuous Flow Processing," Processes, vol. 2, Jan. 2014, XP002744189, pp. 58-70.*
International Search Report dated Feb. 19, 2016 in PCT/FR2015/053561 filed Dec. 17, 2015.

* cited by examiner

Primary Examiner — Mark Kaucher
Assistant Examiner — Henry Hu
(74) Attorney, Agent, or Firm — Oblon, McClelland, Maier & Neustadt, L.L.P.

(57) ABSTRACT

The invention relates to a novel method for the continuous production of anionic polymers by radical polymerization. The polymers produced by said method have a controlled molecular weight.

13 Claims, 2 Drawing Sheets

METHOD FOR THE CONTINUOUS PRODUCTION OF ANIONIC POLYMERS USING RADICALS

The invention relates to a method for the continuous production of anionic polymers using radicals, and also to the polymers obtained by means of this method.

TECHNICAL BACKGROUND

The continuous polymerization of anionic polymers using radicals has already been described in application US 2014/0088280.

In this application, the inventors have sought to develop a method allowing the production of anionic polymers in solution with a defined, very narrow molar distribution by mass, which is energy saving, that is to say without preheating, with a reduced risk of clogging in the micromixer and/or the reactor and/or, as much as possible, making it possible to avoid corrosion problems in the case of the use of monomers containing acid groups.

The inventors have thus proposed the use of microreactors having an internal diameter of less than 30 mm. Their method requires several mixes upstream of the microreactor and a microreactor per polymerization area.

However, there is a constant search for methods which allow the continuous polymerization of polymerizable anionic monomers using radicals, the polymerization reaction of which is particularly exothermic and rapid, thereby generating numerous technical and safety problems. Mention will in particular be made of acrylic acid, which is an extremely reactive monomer. It is in particular for this reason that, from an industrial point of view, it is still at the current time preferred to use semi-batch methods which however create relatively long cycle times.

In addition, to the inventors' knowledge, in the continuous reactors proposed to date, problems of formation of plugs which block the reactors, due to the formation of gels during the polymerization, are encountered. In addition, the degrees of conversion are often low and can require additional treatments.

DESCRIPTION OF THE INVENTION

Figure 1:
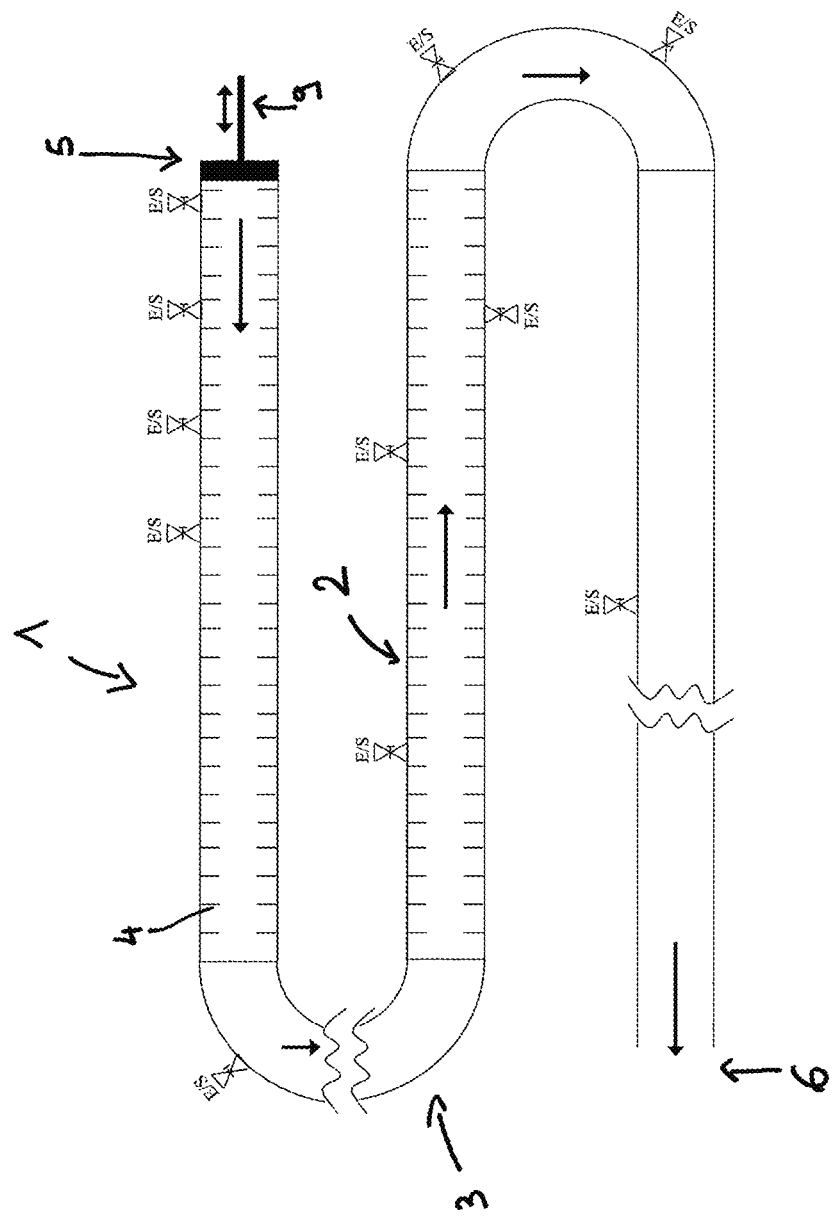
FIG. 1 shows a reactor according to one embodiment of the invention.

The invention thus provides a novel method for the continuous production of anionic polymers using radical polymerization. The polymers produced by means of this method have a controlled molecular weight and a low polydispersity index.

A subject of the invention is a method for the continuous production of an anionic polymer, having a molecular weight Mw of less than 10000 g/mol, and a solids content (SC) of between 20% and 60% by weight, relative to the total weight of the formula, by radical polymerization, comprising the following steps:

a) at least one monomer chosen from acrylic acid, methacrylic acid and mixtures thereof is provided, it being possible for said monomer to be partially neutralized,
b) water, optionally hot water, is provided,
c) at least one initiator is provided,
d) at least one chain-transfer agent is optionally provided,
e) the components of steps a), b), c) and d) are introduced into a tubular reactor having a length $L_R$ of at least 5 m and comprising at least one tubular section of length $L_S$ and of internal diameter D such that $L_S$ is at least 20 times larger than D, in which each tubular section comprises, over its entire length, a plurality of stationary baffles, opposing the stream, in the form of washers having a diameter identical to the internal diameter of the tubular section, thus forming a fluid in the tubular reactor,
f) the tubular section is connected to a device which makes it possible to subject said fluid to an oscillatory movement,
g) a polymerization reaction is carried out in said reactor, optionally with a heating means which makes it possible to initiate the polymerization reaction, with a residence time in the reactor of greater than 1 min, the residence time, the size of the holes in the baffles, their spacing, and the movements of the device being chosen so as to provide, at any point in the reactor, good homogeneity of the mixture,
h) said anionic polymer in solution in water is obtained at the outlet of the reactor.

Polymers are generally characterized by two indices/parameters/values:
the polydispersity index PDI (also equivalently referred to as polymolecularity IP) and
the molecular weight Mw (also equivalently referred to as molar mass or molecular mass), expressed in g/mol.

The polydispersity index PDI of the polymer is calculated in the following way: it is the ratio of the weight-average molecular weight Mw to the number-average molecular weight Mn.

The polydispersity index reflects the distribution of the molar masses of the various macromolecules in the polymer solution. If all the macromolecules have one and the same degree of polymerization (thus one and the same molecular weight), this index is close to 1. If, on the other hand, the macromolecules have different degrees of polymerization (thus different molecular weights), the PDI index is greater than 1.

The molecular weight Mw and the PDI index are determined by gas chromatography (GC) according to the method described before the examples.

The molecular weight Mw of the anionic polymer obtained by means of the method according to the invention is advantageously between 1500 and 10000 g/mol, more advantageously between 3500 and 7000 g/mol.

The polydispersity index of the anionic polymer obtained by means of the method according to the invention is advantageously less than 4, more advantageously less than 3.5, even more advantageously less than 3, even more advantageously less than 2.5. The polydispersity index of the anionic polymer obtained by means of the method according to the invention is advantageously between 1.5 and 4, more advantageously between 1.5 and 3.5, even more advantageously between 1.5 and 3, even more advantageously between 1.5 and 2.5.

The solids content (SC) of the anionic polymer obtained by means of the method according to the invention is advantageously between 30% and 60% by weight or between 40% and 60% by weight, relative to the total weight of the formula.

Monomers:

The monomer is chosen from acrylic acid, methacrylic acid and mixtures thereof. Thus, the anionic polymer obtained may be a homopolymer or a copolymer.

The term "(meth)acrylic acid homopolymer or copolymer" is intended to mean either a polymer made exclusively of acrylic acid (acrylic acid homopolymer), or a polymer made exclusively of methacrylic acid (methacrylic acid homopolymer), or alternatively a polymer made of a mixture of acrylic acid and methacrylic acid (acrylic acid/methacrylic acid copolymer). In the latter case, according to one aspect of the invention, the molar ratio between acrylic acid monomers and methacrylic acid monomers can vary between 1:100 and 100:1, for example between 1:1 and 100:1 or between 1:1 and 50:1.

Said monomer may be partially neutralized. Thus, in one implementation variant, 2% to 50% by weight of the (meth)acrylic acid monomer, relative to the total weight of the (meth)acrylic acid monomer introduced, is neutralized.

It can be neutralized by means of a single neutralizing agent or several neutralizing agents. The monomer can be, for example, partially neutralized by means of an alkali or alkaline-earth hydroxide, an alkaline-earth oxide, and/or with an amine. By way of example, mention may be made of sodium hydroxide, potassium hydroxide, lithium hydroxide, calcium hydroxide, magnesium hydroxide, calcium oxide and potassium oxide.

Moreover, the copolymer according to the invention may also comprise, in addition, one or more other ethylenically unsaturated monomer(s), chosen from the group made up of 2-acrylamido-2-methylpropanesulfonic acid (AMPS), maleic acid, fumaric acid, crotonic acid, itaconic acid, unsaturated acrylic acid telomers, and the monomers of formula (I):

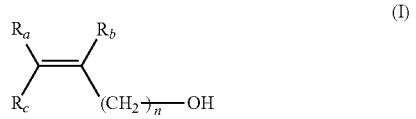

wherein:
$R_a$, $R_b$ and $R_c$ represent, independently of one another, H or $CH_3$,
n is an integer varying between 0 and 2 (that is to say 0, 1 or 2).

In particular, the monomer may be allyl alcohol (n=1), methallyl alcohol (n=1) or isoprenol (n=2). Isoprenol is advantageously used.

The term "unsaturated acrylic acid telomers" is intended to mean acrylic acid or acryloxypropionic acid oligomers of formula (II):

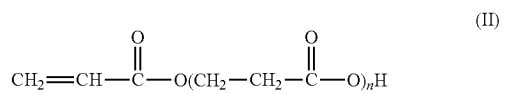

wherein n is an integer varying from 1 to 10. These various oligomers may be in a mixture. When n=1, the oligomer is an acrylic acid dimer.

In the presence of other unsaturated monomer(s), according to one aspect of the invention, the molar ratio between (meth)acrylic acid monomers and other unsaturated monomer(s) can vary between 1:1 and 100:1, for example between 1:1 and 75:1 or between 1:1 and 50:1.

The monomer is advantageously acrylic acid.

At least one initiator and, optionally, at least one chain transfer agent are introduced into the reactor, with these monomers. At least one catalyst based on water-soluble metal salts can also be introduced.

According to the present invention, the term "initiator" is intended to mean an initiating system comprising an oxidizing agent and optionally a reducing agent.

In particular, the following systems are used:
hydrogen peroxide ($H_2O_2$), catalyst based on water-soluble metal salts, dipropyl dipropionic acid trithiocarbonate (DPTTC, CAS No. 6332-91-8) or salts thereof, for example the disodium salt thereof (sodium dipropionate trithiocarbonate or disodium salt of 2,2'-[carbonothioylbis(thio)]bis-propanoic acid, CAS No. 86470-33-2), as represented by formula (III) below:

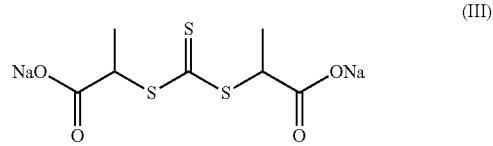

$H_2O_2$, catalyst based on water-soluble metal salts,
$H_2O_2$, catalyst based on water-soluble metal salts, sodium hypophosphite,
$H_2O_2$, sodium hypophosphite,
$H_2O_2$, catalyst based on water-soluble metal salts, sodium betabisulfite or sodium metabisulfite,
Persulfate, catalyst based on water-soluble metal salts,
Persulfate, sodium betabisulfite or sodium metabisulfite,
Persulfate, sodium hypophosphite, with or without catalyst based on water-soluble metal salts,
Persulfate, $H_2O_2$, sodium hypophosphite, with or without catalyst based on water-soluble metal salts,
$H_2O_2$, dipropyl trithiocarbonate, sodium hypophosphite, with or without catalyst based on water-soluble metal salts.

The persulfate is advantageously a sodium persulfate.

The catalyst based on water-soluble metal salts is advantageously chosen from the group made up of copper carbonates, copper sulfate, iron sulfate and a mixture of these compounds.

When the system comprises hydrogen peroxide and a catalyst based on water-soluble metal salts, hydroxylamine sulfate, which makes it possible in particular to lower the initiation temperature and to reduce the induction temperature, can also be added thereto.

Mercaptans, as sole transfer agent or with the abovementioned transfer agents, can be used to limit the molecular weights.

The polymerization is carried out substantially in water.

Method:

Each of the components of steps a), b), c) and d), are introduced into the reactor. Advantageously, at least one catalyst based on water-soluble metal salts is also provided. The water may be hot.

The term "hot" is intended to mean that the water is at a temperature above 20° C., up to its boiling point. In one variant, the water is heated to a temperature above 60° C., for example above 80° C.

The method according to the invention makes it possible to envision a large number of possibilities in the introduction of the components, depending on the nature of the components and on the final applicative properties of the desired polymers. Thus, each of the components can be introduced at the same point in the reactor or at different points. In addition, for each of the components, the introduction may be total or sequenced at various places in the reactor, with a constant or variable flow rate.

According to one embodiment, the initiator is introduced at the inlet and/or downstream of the reactor, one or more times. When the initiator comprises an oxidizing agent and a reducing agent, they can be administered separately.

According to another embodiment, the transfer agent is introduced at the inlet and/or downstream of the reactor, one or more times.

According to yet another embodiment, the monomer is introduced at the inlet and/or downstream of the reactor, one or more times.

According to one embodiment, the catalyst based on water-soluble metal salts is introduced at the inlet and/or downstream of the reactor, one or more times. Each of these compounds can be introduced alone, or as a mixture with any one or all of the other compounds, in suitable proportions.

For the purposes of the present invention, the term "downstream" is intended to mean a point of introduction which is closer to the outlet of the reactor than it is to the point of entry of the reactor.

When the monomer is mixed with water before introduction into the reactor, the mixture is homogenized, advantageously in a static mixer (for example of Sulzer SMX® type). It is also possible to add to this homogenous mixture:
  at least one initiator,
  optionally at least one transfer agent,
  optionally at least one catalyst based on water-soluble metal salts.

The method according to the invention is characterized in that a device which makes it possible to subject the fluid to an oscillatory movement is used.

The amplitude of the oscillatory movement advantageously varies from 0.3×d2 to 4×d2, more advantageously from 0.7×d2 to 3×d2, even more advantageously from 1×d2 to 2×d2. d2 is the external diameter of the baffles, as defined below.

The frequency of the oscillatory movement advantageously varies from 0.1 to 100 Hz, more advantageously from 0.1 to 10 Hz, for example from 0.1 to 5 Hz, from 0.5 to 5 Hz or from 3 to 10 Hz.

According to one embodiment, the amplitude of the oscillatory movement varies from 0.3×d2 to 4×d2, and the frequency of the oscillatory movement varies from 0.1 to 100 Hz.

In the method according to the invention, the reactor is filled with liquid. Some reactions can generate gases, but ideally the method remains under conditions such that the rate of filling of the reactor with liquid, namely the volume occupied by the liquid in the reactor relative to the total volume of the reactor, is greater than 90%.

At start-up, the reactor is advantageously prefilled with water, which may be hot.

The device is any means which makes it possible to impose an oscillatory directional movement on the fluid. This device may for example be a hydraulic piston, one or more membranes, or a mechanical piston.

This device may be external to the tubular reactor.

The reactor/device assembly forms a COBR for "Continuous Baffled Reactor".

The term "tubular" is intended to mean a reactor of which the length is much larger than the section.

In one embodiment of the present invention, this section is circular. In this case, the term cylindrical tubular reactor will be used.

In the present invention, the embodiment in which the section is circular is described in detail. This description will be adapted by the person skilled in the art when the section is not circular.

The tubular reactor comprises at least one tubular section having a length $L_S$ and an internal diameter D with $L_S$ being at least 20 times larger than the internal diameter D. $L_S$ may be identical to $L_R$.

In order to save floor space, the tubular reactor may comprise at least two tubular sections, each tubular section having an identical internal diameter, mounted substantially in parallel and connected by a bend. The bend is advantageously U-shaped. The bend itself also advantageously comprises baffles.

Advantageously, each tubular section has a constant internal diameter, which is identical from one section to the other. D is advantageously less than 20 cm, more advantageously less than 15 cm, even more advantageously less than or equal to 10 cm. D is advantageously greater than 3 cm.

In the areas where the polymerization can take place, each tubular section of the reactor comprises, over its entire length, a plurality of stationary baffles opposing the stream. According to the present invention, the term "opposing the stream" is intended to mean that the angle of the baffles, relative to the stream, varies from 80° to 100°. It is, for example, perpendicular or substantially perpendicular.

The baffles are in the form of washers having a diameter identical to the internal diameter D of the tubular section. The baffles can be mounted on a rail thus facilitating their implantation. This rail can be easily removed and then reintroduced into the tubular section, thus facilitating cleaning and maintenance of the reactor.

The term "washers" is intended to mean disks bearing concentric annular holes which have the appearance of washers. The largest diameter of this washer is called the external diameter d2.

The expression "having a diameter identical to the internal diameter of the tubular section" is intended to mean that the external diameter d2 is substantially equal to the diameter D so as to force all the material to cross the baffle by passing through its central opening, while at the same time being slightly smaller so as to allow manipulation (insertion/removal) of the rail without friction, in particular during the reactor cleaning/maintenance phases.

The baffles are spaced regularly or irregularly, apart by a distance advantageously ranging from 1D to 3D, but allowing homogeneity to be maintained. In one variant, the spacing between the baffles is regular. In another variant, the spacing between the baffles is irregular. Advantageously, the baffles are spaced apart by a distance ranging from 1D to 2.5D, for example 2D.

The spacing of the baffles can be adjusted according to the progression of the polymerization reaction, and thus can be different in the areas where the polymerization begins, in the areas where the polymerization is ongoing, and in the areas where the polymerization ends.

The presence of baffles is necessary during the polymerization method. Thus, advantageously, as long as the rate of conversion of the monomer is less than 90%, the tubular reactor comprises baffles.

Advantageously, the baffles comprise concentric annular holes such that the d2/d1 ratio, where d2 is the external diameter of the washer and d1 the internal diameter of the washer, varies from 1.2 to 5, more advantageously from 1.5 to 2.5.

The residence time in the reactor is advantageously between 1 min and 20 min, more advantageously between 1 min and 10 min.

The flow rate in each tubular section can be high to very high. It is advantageously greater than 20 kg/h, more advantageously greater than 100 kg/h and can range up to 1 or several metric tonne(s)/h, depending on the diameter.

It is possible to introduce reactants at various points of the reactor. It is also possible to insert measurement and/or control instruments, probes or sensors, making it possible in particular to measure, on line or continuously, the temperature, the pressure, the rate of conversion and the viscosity. Mention will for example be made of infrared, near infrared or mid-IR measurements and RAMAN measurements.

The heating means may be the introduction of hot water directly into the tubular reactor and/or the reactor may comprise one or more devices which make it possible to provide heat, such as a jacket.

In one embodiment, the reactor comprises at least one device which makes it possible to provide or discharge heat, such as sections of jacket, allowing control of the temperature which may be different from one area to the other. As required, the means can reheat or cool certain sections of the tubular reactor.

An example of a reactor is represented in FIG. 1. In this figure, a baffled tubular reactor is generally represented in 1 and comprises tubular sections 2 connected by U-shaped bends 3. Extending radially toward the inside from the side of the container, there are a certain number of annular baffles 4. The annular baffles are joined together by rails (not represented in FIG. 1) substantially equidistantly, and are arranged substantially in parallel. The annular baffles are present in each tubular section, including in the U-shaped bends. Even though they are not represented in FIG. 1).

The reactor comprises an inlet 5 and an outlet 6.

The reactor also comprises reactant introduction areas and measurement areas, represented by the symbol E/S on the figure. E/S signifies inlet/outlet, and thus shows that it is possible to introduce reactants or measuring instruments into the reactor, but that it is also possible to take for example samples.

At the inlet, the reactor is connected to an external device 9 which makes it possible to subject the fluid to an oscillatory movement.

Tubular sections not comprising baffles, in areas where the polymerization is finished (consumption of the monomer and/or the radicals) and where the polymer formed can for example be neutralized, have also been represented in this figure.

A jacket, or a jacket segment, which would make it possible to control and maintain a constant temperature or a uniform temperature profile gradient in the reactor 1 by means of a cooler/reheater, has not been represented in this case.

Figure 2:
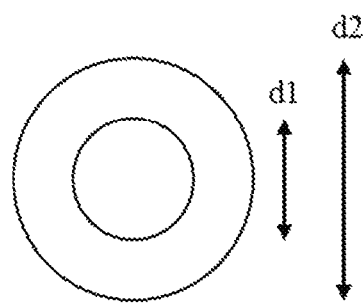
FIG. 2 shows a baffle with internal diameter d1 and external diameter d2.

The internal diameters d1 and external diameters d2 of the baffle have been represented in FIG. 2.

The method according to the invention makes it possible to efficiently control the molecular weight of the polymer formed. It also makes it possible to obtain polymers having a low polydispersity index.

By virtue of the method, the rate of conversion of the monomer is high. It advantageously varies from 80% to 100%, for example from 90% to 100%.

The polymers obtained by means of the method according to the invention or using an apparatus according to the invention can be used as descaling agent in water treatment or as additive in detergent formulations.

In one advantageous variant of the invention, a neutralizing agent, such as an alkali metal or alkaline-earth metal hydroxide, is also injected into the reactor, in an area where the conversion of the monomer is greater than 90%. Such an injection will make it possible to carry out, in this same reactor, a reaction for neutralization of the polymer formed.

The polymer may be totally or partially neutralized, by means of one or more neutralizing agents, for example monovalent (or monofunctional) or plurivalent (plurifunctional or divalent) neutralizing agents.

If the polymer is partially neutralized, this may by means of a single neutralizing agent or several neutralizing agents.

For example, it is possible to envision the following neutralization modes, alone or in combination:
- a molar percentage of a neutralization of the active acid sites of the polymer by a neutralizing agent containing the calcium ion of between 2% and 60%, for example of between 25% and 55% or between 2% and 15%,
- a molar percentage of neutralization of the active acid sites of the polymer by one or more monofunctional neutralizing agents containing the sodium ion and/or the lithium ion and/or the potassium ion of between 7% and 97%, for example between 20% and 60% or between 60% and 97%,
- a molar percentage of neutralization of the active acid sites of the polymer by a neutralizing agent containing the magnesium, barium, zinc or aluminum ion or an amine or mixtures thereof and in particular by a neutralizing agent containing the magnesium ion of between 0% and 60%, for example of between 10% and 55%.

Starting from the area of introduction of these neutralizing agents, the tubular sections may or may not comprise baffles.

At the outlet, the reactor may be connected to a tubular reactor optionally equipped with an oscillatory device as defined previously, to a stirred reactor and/or a flash distillation column. The tube can make it possible to carry out a reaction for neutralization of the polymer formed. The flash distillation column makes it possible to increase the solids content of the polymer through the use of the heat resulting from the polymerization and elimination of the water by expansion.

The method according to the invention is particularly suitable for the synthesis of poly(acrylic acid). By means of the method according to the invention, it is possible to obtain a poly(acrylic acid) having a molecular weight Mw of between 1000 and 10000 g/mol and a polydispersity index PDI of between 1.5 and 4. It is subsequently possible to easily neutralize it continuously, either in the tubular reactor itself, or in a tube connected to the reactor, as described previously.

The molecular weight Mw of the poly(acrylic acid) obtained by means of the method according to the invention is for example between 1500 and 10000 g/mol, or for example between 3500 and 7000 g/mol.

The polydispersity index PDI is advantageously between 2 and 3, more advantageously between 2 and 2.6.

A subject of the invention is thus also a method according to the invention, wherein the monomer is acrylic acid and the polymer obtained is poly(acrylic acid) having a molecular weight Mw of between 1000 and 10000 g/mol and a polydispersity index of between 1.5 and 4.

A subject of the invention is also the anionic polymers obtained by means of the method according to the invention.

Description of the Methods of Characterization of the Polymers Obtained

Molecular Weight Mw of the Polymer:

Such a technique uses a liquid chromatography apparatus of the Waters™ brand, fitted with a detector. This detector is a refractometric concentration detector of the Waters™ brand.

This liquid chromatography equipment is fitted with a size exclusion column suitably chosen by the person skilled in the art in order to separate the various molecular weights of the polymers studied. The liquid elution phase is an aqueous phase adjusted to pH 9 with 1N sodium hydroxide containing 0.05 M of $NaHCO_3$, 0.1 M of $NaNO_3$, 0.02 M of triethanolamine and 0.03% of $NaN_3$.

In detail, according to a first step, the polymerization solution is diluted to 0.9% on a dry basis in the SEC dissolution solvent, which corresponds to the SEC liquid elution phase to which is added 0.04% of dimethylformamide which acts as a flow marker or internal standard. Filtration at 0.2 μm is then carried out. 100 μl are then injected into the chromatography apparatus (eluant: an aqueous phase adjusted to pH 9.00 with 1N sodium hydroxide containing 0.05 M of $NaHCO_3$, 0.1 M of $NaNO_3$, 0.02 M of triethanolamine and 0.03% of $NaN_3$).

The liquid chromatography apparatus contains an isocratic pump (Waters™ 515), the flow rate of which is regulated at 0/8 ml/min. The chromatography apparatus also comprises an oven which itself comprises, in series, the system of the following columns: a precolumn of Waters™ Ultrahydrogel Guard Column type which is 6 cm long and has a 40 mm internal diameter, and a linear column of Waters™ Ultrahydrogel type which is 30 cm long and has an internal diameter of 7.8 mm. The detection system, for its part, is composed of a refractometric detector of Waters™ RI 410 type. The oven is brought to a temperature of 60° C., and the refractometer is brought to a temperature of 45° C.

The chromatography apparatus is calibrated using standards of sodium polyacrylate powder of various molecular masses certified by the supplier: Polymer Standard Service or American Polymer Standards Corporation.

Amount of Residual Monomers:

The amount of residual monomers is measured according to conventional techniques, known to the person skilled in the art, for example High Performance Liquid Chromatography (HPLC). In this method, the constituent components of the mixture are separated on a stationary phase, and detected with a UV detector. After calibration of the detector, the amount of residual (meth)acrylic acid can, for example, be obtained from the area of the peak corresponding to the acrylic compound.

This method is in particular described in the manual "Chimie Organique Expérimentale" [Experimental Organic Chemistry], by M. Chavanne, A. Julien, G. J. Beaudoin, E. Flamand, $2^{nd}$ Edition, published by Modulo, chapter 18, pages 271-325.

Solids Content:

The polymer concentration is measured by desiccation, using methods known to the person skilled in the art.

Residence Time:

It can be measured using a tracer such as a saline solution. To do this, for an imposed flow rate, a saline solution is injected at t=0 and the conductivity and variation in conductivity is measured, as a function of time, at the reactor outlet.

The following examples illustrate the invention.

EXAMPLE 1

This example illustrates the continuous polymerization of acrylic acid in a tubular reactor having a length L=20 m and an internal diameter D=15 mm, equipped with a system that can oscillate at a frequency of from 0 to 10 Hz with an amplitude of between 0 and 5 cm. The oscillations are mechanically transmitted to the fluid present inside said reactor by means of an impermeable sliding piston. A Ni-Tech® reactor is used in this case.

The acrylic acid is polymerized in the presence of an initiating system composed of hydrogen peroxide, coupled with metal salts and also hydroxylamine sulfate. A transfer agent is used in order to limit the molecular masses of the poly(acrylic acid) produced. It is the DPTTC salt. The final solids content of poly(acrylic acid) is approximately 35%.

The reactants are separated in three distinct preparing tanks and are mixed just before they are introduced into the tubular reactor in order to be sure that the polymerization begins only inside said reactor. The reactants from the three tanks are mixed using a static mixer (of SMX® type) using three distinct pumps.

The flow rates for introducing the reactants into the static mixer and thus into the reactor located downstream are regulated such that the masses introduced are proportional to the values mentioned in the table below:

TABLE 1

| Tank 1 | Tank 2, thermostated at 80° C. | | | | Tank 3 | |
|---|---|---|---|---|---|---|
| 100% AA (kg) | 100% DPTTC salt (kg) | Fe sulfate (kg) | Hydroxylamine sulfate (kg) | Demineralized water (kg) | Hydrogen peroxide 35% (kg) | Demineralized water (kg) |
| 35 | 1.5 | 0.1 | 0.025 | 55 | 4.5 | 4 |

AA = acrylic acid

The flow rates of the three pumps connected to the three preparing tanks are then proportionately modified in order to adjust the residence time in the tubular reactor. Said residence time is measured visually by adding a colored tracer or by means of a conductor meter and a saline solution.

The polymer produced in this way can be collected in order to evaluate the physicochemical characteristics thereof. The product removed is an aqueous polymeric solution of low viscosity.

In addition to the overall flow rate (resulting from the sum of the flow rates of the three pumps), the frequency and also the amplitude transmitted by the oscillator can be modified. As soon as one of these parameters is modified, it is necessary to wait for a time at least equal to five times the residence time in the reactor before collecting a sample at the outlet of the reactor or at an intermediate collection point (this being in order to achieve the stationary conditions characteristic of a continuous method.

For the recipe of table 1, a residence time in the reactor of approximately four minutes makes it possible to obtain an acceptable rate of conversion. The flow rate of the three pumps is then fixed so that the overall flow rate is close to 40 kg per hour.

Under these operating conditions, the amplitude and the frequency of the oscillations are modified. In all situations, exothermia and also a pressure increase are observed in the reactor. The maximum temperature observed was 150° C. and the maximum pressure was 10 bar.

Characterization of the Polymers Obtained:

TABLE 2

| Frequency (Hz) | Amplitude (mm) | Conversion (%) | Mn (g/mol) | Mw (g/mol) | IP |
|---|---|---|---|---|---|
| 1.25 | 25 | 94.9 | 1925 | 5570 | 2.9 |
| 1.25 | 50 | 98 | 2150 | 5980 | 2.8 |
| 2.5 | 12.5 | 95.2 | 1870 | 5405 | 2.9 |
| 2.5 | 25 | 94.8 | 1960 | 5485 | 2.8 |
| 2.5 | 50 | 92.1 | 1790 | 5650 | 3.2 |
| 5 | 25 | 96.3 | 1750 | 5040 | 2.9 |
| 5 | 50 | 94.8 | 1710 | 5320 | 3.1 |
| 10 | 25 | 95.6 | 1800 | 5460 | 3.0 |
| 10 | 50 | 97.3 | 1880 | 5190 | 2.8 |

Gel formation was not observed.

EXAMPLE 2

This example illustrates the continuous polymerization of acrylic acid in a tubular reactor having a length L=20 m and an internal diameter D=5 mm equipped with a system that can oscillate at a frequency of from 0 to 10 Hz with an amplitude of between 0 and 5 cm. The oscillations are mechanically transmitted to the fluid present inside said reactor using an impermeable sliding piston. A Ni-Tech® reactor is used in this case.

The recipe is similar to that used in example 1. The final solids content of poly(acrylic acid) is approximately 35%.

The flow rates for introducing the reactants into the static mixture and thus into the reactor located downstream are regulated such that the masses introduced are proportional to the values mentioned in table 1, example 1.

The residence time in the reactor is fixed at approximately two minutes and the flow rate of the three pumps is then fixed so that the overall flow rate is close to 80 kg per hour.

Under these operating conditions, the amplitude and the frequency of the oscillations are modified. In all situations, exothermia and also a pressure increased are observed in the reactor. The maximum temperature observed was 150° C. and the maximum pressure was 10 bar.

Characterization of the Polymers Obtained:

TABLE 3

| Frequency (Hz) | Amplitude (mm) | Conversion (%) | Mn (g/mol) | Mw (g/mol) | IP |
|---|---|---|---|---|---|
| 1.25 | 25 | 93.1 | 2050 | 6200 | 3.0 |
| 1.875 | 25 | 91.2 | 1950 | 6450 | 3.3 |
| 2.5 | 25 | 93.2 | 1840 | 5930 | 3.2 |
| 5 | 25 | 95.3 | 1910 | 6030 | 3.2 |
| 10 | 25 | 90.7 | 2020 | 6740 | 3.3 |

Gel formation was not observed.

EXAMPLE 3

This example illustrates the continuous polymerization of acrylic acid in a tubular reactor having a length L=20 m and an internal diameter of D=15 mm, equipped with a system that can oscillate at a frequency of from 0 to 10 Hz with an amplitude of between 0 and 5 cm. The oscillations are mechanically transmitted to the fluid present inside said reactor by means of an impermeable sliding piston. A Ni-Tech® reactor is used in this case.

The acrylic acid is polymerized in the presence of an initiating system composed of sodium persulfate, coupled with metal salts and also sodium hypophosphite. The latter acts as both a reducing agent and a transfer agent. The final solids content of poly(acrylic acid) is approximately 35%.

The reactants are separated in three distinct preparing tanks and are mixed just before they are introduced into the tubular reactor in order to be sure that the polymerization begins only inside said reactor. The reactants from the three tanks are mixed using a static mixture (of SMX type) using three distinct pumps.

The flow rates for introducing the reactants into the static mixer and thus into the reactor located downstream are regulated such that the masses introduced are proportional to the values mentioned in the table below:

TABLE 4

| Tank 1 | Tank 2, thermostated at 80° C. | | | Tank 3 | |
|---|---|---|---|---|---|
| 100% AA (kg) | Iron sulfate (kg) | Sodium hypophosphite (kg) | De-mineralized water (kg) | Sodium persulfate (kg) | De-mineralized water (kg) |
| 35 | 0.01 | 6.0 | 45 | 4 | 10 |

The flow rates of the three pumps connected to the three preparing tanks are then proportionately modified in order to adjust the residence time in the tubular reactor. Said residence time is measured visually by adding a colored tracer or using a conductometer and a saline solution.

The polymer produced in this way can be collected in order to evaluate the physicochemical characteristics thereof. The product removed is an aqueous polymeric solution of low viscosity.

In addition to the overall flow rate (resulting from the sum of the flow rates of the three pumps), the frequency and also the amplitude transmitted by the oscillator can be modified. As soon as one of these parameters is modified, it is necessary to wait for a time at least equal to five times the residence time in the reactor before collecting a sample at the outlet of the reactor or at an intermediate collection point (this being in order to achieve the stationary conditions characteristic of a continuous method).

In all situations, exothermia and also a pressure increase are observed in the reactor. The maximum temperature observed was 155° C. and the maximum pressure was approximately 11 bar.

For the recipe as described above, a residence time in the reactor of approximately three minutes makes it possible to obtain a very good rate of conversion. The flow rate of the three pumps is then fixed so that the overall flow rate is close to 60 kg per hour. Under these operating conditions, the amplitude and the frequency of the oscillations are modified.

Characterization of the Polymers Obtained:

TABLE 5

| Frequency (Hz) | Amplitude (mm) | Conversion (%) | Mn (g/mol) | Mw (g/mol) | IP |
|---|---|---|---|---|---|
| 0.625 | 50 | 99.1 | 1540 | 4565 | 3.0 |
| 1.25 | 25 | 99.99 | 1535 | 6040 | 3.9 |
| 1.25 | 50 | 99.99 | 1445 | 5785 | 4.0 |
| 2.5 | 25 | 99.6 | 2210 | 8960 | 4.1 |
| 2.5 | 50 | 99.99 | 1750 | 6780 | 3.9 |

TABLE 5-continued

| Frequency (Hz) | Amplitude (mm) | Conversion (%) | Mn (g/mol) | Mw (g/mol) | IP |
|---|---|---|---|---|---|
| 5 | 25 | 98.9 | 1830 | 6540 | 3.6 |
| 5 | 50 | 99.7 | 2150 | 7300 | 3.4 |
| 10 | 5 | 99.99 | 2130 | 7650 | 3.6 |
| 10 | 25 | 99.99 | 1970 | 6600 | 3.4 |
| 10 | 50 | 97.6 | 1630 | 5830 | 3.6 |

Gel formation was not observed.

The invention claimed is:

1. A method for continuously preparing an anionic polymer by radical polymerization, the method comprising:
introducing at least one monomer selected from the group consisting of acrylic acid, methacrylic acid, and a mixture thereof; water; at least one initiator; and optionally at least one chain transfer agent into a tubular reactor, thus forming a fluid stream in the tubular reactor,
carrying out a polymerization reaction in the tubular reactor, optionally with a heating means to initiate the polymerization reaction and with a residence time in the reactor of greater than 1 min,
subjecting the fluid stream during the polymerization reaction to an oscillatory movement,
and
obtaining the anionic polymer in solution in water at an outlet of the tubular reactor,
wherein
the at least one monomer is optionally partially neutralized,
a temperature of the water is greater than 20° C.,
a solids content of the water solution of the anionic polymer is between 20% and 60% by weight, relative to a total weight of the anionic polymer, and a molecular weight Mw of less than 10 000 g/mol,
the tubular reactor has a length $L_R$ of at least 5 m and comprises at least one tubular section of length $L_S$ and internal diameter D such that $L_S$ is at least 20 times larger than D,
each tubular section comprises, over an entire length, a plurality of stationary baffles having holes, opposing the fluid stream, in a form of washers having a diameter identical to the internal diameter D of the tubular section,
each tubular section is connected to a device, which subjects the fluid stream to an oscillatory movement,
an amplitude of the oscillatory movement is from 0.3×d2 to 4×d2, wherein d2 is the external diameter of the stationary baffles,
a frequency of the oscillatory movement is from 0.1 to 100 Hz,
and
the residence time in the tubular reactor, size of the holes in the baffles, spacing of the baffles, and oscillatory movement of the device provides at any point in the tubular reactor, a homogeneous fluid stream.

2. The method of claim 1, wherein D is less than 20 cm.

3. The method of claim 1, wherein the baffles are spaced out, regularly or irregularly, by a distance ranging from 1D to 3D.

4. The method of claim 1, wherein the baffles comprise concentric annular holes such that a d2/d1 ratio varies from 1.2 to 5, wherein d2 is an external diameter of the washer and d1 the internal diameter of the washer.

5. The method of claim 4, wherein amplitude of the oscillatory movement varies from 0,3×d2 to 4×d2, and frequency of the oscillatory movement varies from 0.1 to 100 Hz.

6. The method of claim 1, wherein the reactor comprises one or more devices which provide or discharge heat so as to allow different temperatures from one area to the other.

7. The method of claim 1, wherein the at least one initiator is introduced at an inlet and/or downstream of the tubular reactor, one or more times.

8. The method of claim 1, wherein the at least one monomer is introduced at an inlet and/or downstream of the tubular reactor, one or more times.

9. The method of claim 1, wherein a catalyst based on water-soluble metal salts is also introduced, at an inlet and/or downstream of the tubular reactor, one or more times.

10. The method of claim 1, wherein
at least one other ethylenically unsaturated monomer is provided, and
the at least one other ethylenically unsaturated monomer is selected from the group consisting of 2-acrylamido-2-methylpropanesulfonic acid (AMPS), maleic acid, fumaric acid, crotonic acid, itaconic acid, an unsaturated acrylic acid telomer, and a monomer of formula (I):

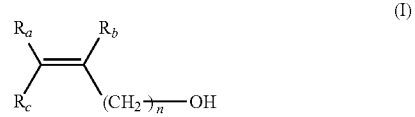

wherein:
$R_a$, $R_b$, and $R_c$ independently represent H or $CH_3$, and
n is an integer varying between 0 and 2.

11. The method of claim 1, wherein the at least one monomer is acrylic acid and the anionic polymer obtained is poly(acrylic acid) having a molecular weight Mw of from 1000 to 10000 g/mol and a polydispersity index of from 1.5 to 4.

12. The method of claim 1 wherein a neutralizing agent is injected into the tubular reactor, in an area where a rate of conversion of the monomer is greater than 90%.

13. The method of claim 1, wherein the tubular reactor is connected, at an outlet, to another tubular reactor optionally equipped with an oscillatory device, to a stirred reactor, and/or to a flash distillation column.

* * * * *